United States Patent
Holler et al.

[11] Patent Number: 5,477,739
[45] Date of Patent: Dec. 26, 1995

[54] PROCESS FOR DETERMINING THE OVERRUN FORCE OF A TRAILER

[75] Inventors: Gustav Holler, Budapest, Hungary; Eduard Gerum, Rosenheim, Germany

[73] Assignee: Knorr Bremse AG, Munich, Germany

[21] Appl. No.: 229,770

[22] Filed: Apr. 19, 1994

[30] Foreign Application Priority Data

Apr. 22, 1993 [DE] Germany .......................... 43 13 198.0

[51] Int. Cl.⁶ .................................................. G01L 5/13
[52] U.S. Cl. ................... 73/862.57; 280/DIG. 4
[58] Field of Search ................. 73/862.57; 280/432, 280/DIG. 14; 180/14.6

[56] References Cited

U.S. PATENT DOCUMENTS

| | | | |
|---|---|---|---|
| Re. 33,697 | 9/1991 | McNinch, Jr. .................. | 280/DIG. 14 |
| 5,330,020 | 7/1994 | Ketcham ............................. | 180/14.6 X |
| 5,403,073 | 4/1995 | Frank et al. .................. | 303/7 |

FOREIGN PATENT DOCUMENTS

| | | |
|---|---|---|
| 288866 | 4/1987 | European Pat. Off. . |
| 374484 | 6/1990 | European Pat. Off. . |
| 532863 | 3/1993 | European Pat. Off. . |
| 4136571 | 3/1993 | Germany . |

Primary Examiner—Richard Chilcot
Assistant Examiner—Elizabeth L. Dougherty
Attorney, Agent, or Firm—Barnes & Thornburg

[57] ABSTRACT

A process is disclosed for determining the overrun force which is produced by a trailer on a tractor during the braking operation without the requirement of a force sensor on the coupling. This process consists essentially of determining the equilibrium of the forces acting upon the tractor in the vertical direction, the equilibrium of forces acting upon the tractor in the horizontal direction, and finally determining the overrun force from the vertical and horizontal equilibrium of forces.

12 Claims, 1 Drawing Sheet

PROCESS FOR DETERMINING THE OVERRUN FORCE OF A TRAILER

BACKGROUND AND SUMMARY OF THE INVENTION

The present invention relates to a process for determining the overrun force which is produced by a trailer on a tractor during the braking operation. According to the invention, the term "trailer" relates to a conventional trailer, which is coupled by a drawbar with the trailer coupling of a conventional truck as well as to a semitrailer which is connected with a fifth wheel of a semitrailer tractor.

In the case of a truck or a semitrailer tractor, the brake pressure required for the braking is supplied to the trailer (or the semitrailer) by an air pressure line or the like. In an ideal case, this brake pressure is to be adjusted or regulated such that the trailer decelerates at exactly the same as its tractor. A brake action of the trailer and the tractor which is coordinated in such a manner has the significant advantage that the braking operation can be controlled very precisely and neither the trailer nor the tractor will jack-knife. At the most, it is permissible to select the brake deceleration of the trailer slightly higher than that of the tractor because in such a case, the braking operation can still be mastered, on the one hand, and the more maintenance-intensive brakes of the tractor are correspondingly conserved, on the other hand.

Since, in the course of time, the braking performance of the brakes of the trailer changes to a different extent than that of the tractor, the relationship of the braking performance of the trailer and the tractor can be ensured only if relatively short service intervals are maintained. Furthermore, it should be taken into account that the weight of the trailer changes as a function of the respective load so that a precise adjustment will only be possible when a so-called automatic braking device ("ALB") is present, which is true only in the case of modern trailers. In order to avoid these disadvantages, it has recently been endeavored to keep the braking force or braking performance of the trailer constant at a respective optimal value by regulating the brake pressure supplied to the trailer as a function of the braking performance of the tractor.

However, such regulating of the braking performance of the trailer is possible only when the force acting on the coupling between the semitrailer and tractor is measured during the braking acts. This force effect of the trailer, which is normally called "overrun force" should therefore, in the above-mentioned ideal case, be equal to zero or at the most should have a slightly negative value. When the overrun force is known or measurable, it is therefore relatively simple to change the brake pressure of the trailer until the overrun force finally reaches the desired value.

However, for measuring the overrun force, a force transducer or load cell must be installed at the corresponding coupling. Because of the very high value, which the coupling force may assume in practice, the price for such a force transducer or sensor may be comparatively high and may therefore be in the order of several thousand Deutsche Mark. Despite the advantages associated with regulating the braking performance of the trailer, this has largely not been implemented because of these high costs.

The invention is based on the object of further developing a process wherein that the respective overrun force can be determined at significantly lower cost.

The invention is based on the idea that the respective or momentary value of the overrun force may possibly also be derived from the measuring signals which already exist in the case of modern tractors, without measuring the overrun force directly by a force transducer. Thus, a force transducer is not required and the costs for determining the overrun force are limited to the use of a correspondingly constructed or modified control unit. Since, particularly when a central computer is available—which is always the case in modern tractors—, the overrun force can be computed only by a suitable change of the central control program, it may even be possible to reduce the costs for this purpose to a negligible value.

For achieving the above-mentioned object, the measurable value which already exist on the tractor be used in such a manner that (a) the equilibrium of the forces is determined which act on the tractor in a vertical or y-direction, (b) the equilibrium of the forces is determined which act on the tractor in the horizontal or x-direction, and (c) the overrun force is determined from the determined vertical and horizontal equilibrium of forces. It was found that the measurable values which exist in the case of modern tractors make it possible to relatively precisely calculate the respective value for the overrun force by means of these equilibria of forces. In detail, the following processes are preferred by the invention:

If the tractor is a conventional truck with a trailer coupling, that is, it is therefore no semitrailer tractor, so that consequently the overrun force (in the following called $F_k$) of the trailer acts exclusively in the horizontal or x-direction, the overrun force $F_k$ is determined by the following equation:

$$F_k = \frac{(F_1 + F_2)}{g} a - F_a$$

In this formula, $F_1$ is the front axle load of the truck; $F_2$ is its rear axle load; $F_a$ is the braking force; a is the braking acceleration; and g is gravitational acceleration. Because of the air suspension, which is now customary in modern trucks, the values $F_1$ and $F_2$ of the front axle load and the rear axle load can easily be detected and measured from the air pressure of the suspension at the respective axle. These quantities of the equation are therefore known. Likewise, from the position of the brake pedal or from the momentary braking pressure, the value $F_a$ of the braking force can be determined. Finally, the actual (braking) acceleration is also known on the basis of the output signals of the sensors of the antiblock system (ABS). Since the gravitational acceleration g is a constant, the value of the overrun force can therefore be determined from the known equation without the use of a corresponding force transducer or force sensor.

Although, as explained above, the value $F_a$ of the braking force can be determined, for example, from the brake pressure, in practice, there is the problem that this measurable quantity permits only an indirect determination of the actually applied braking performance. The reason is that, depending on the wear and the temperature of the brake, the actual braking performance will deviate from a specific desired value so that the value $F_a$ is not completely certain. In order to keep the influence of the uncertainty of the measurable value $F_a$ on the result of the calculation as small as possible, it is suggested according to the further development of the invention to also determine the equilibrium of moments relative to the center of gravity (in the following called S) of the truck. In this case, it is possible to determine the overrun force $F_k$ by the following equation:

$$F_k = \frac{F_1\left(x_1 - \frac{a}{g}y_{12}\right) + F_2\left(x_2 - \frac{a}{g}y_{12}\right)}{y_{ak}}$$

wherein $x_1$, $x_2$ and $y_{12}$ are the respective relative position of the axles of the truck to its center of gravity S, and $y_{ak}$ is the vertical distance of the coupling to the wheel axle. The value $y_{ak}$ of the vertical distance of the coupling to the wheel axis is a function of the geometry of the vehicle and is therefore a constant which must only be put in once (that is, an input value).

The values $x_1$ and $x_2$ can be determined according to a special aspect of the invention in a simple manner. The equilibrium of moments is determined at the point in time at which the truck rolls in the unaccelerated condition because in this case, a simple calculation is possible from the distance between axles or wheel base, as indicated in detail in the description of the figures. The rolling condition of the truck can be derived in a simple manner, for example, from the output signals of an electronic diesel injection device ("Electronic Diesel Control—EDC") and therefore represents a measurable value. It may also be possible to determine the values of $x_1$ and $x_2$ in the same manner when the truck is stopped or parked. However, in this case, it must be taken into account that this measurement will furnish correct values only when a freedom from forces exists in this stopped condition; that is, the truck must, for example, be completely uncoupled.

In contrast, the relative vertical position $y_{12}$ of the axles of the truck can be determined by the following formula:

$$y_{12} = y_{ak} - \frac{(F_1 \times x_1 + F_2 \times x_2 - F_a \times y_{ak})}{(F_1 + F_2)} \times \frac{g}{a}$$

Since the slightly uncertain value $F_a$ enters comparatively little into this formula, the calculation of $y_{12}$ and therefore specifically that of $F_k$ is relatively precise. Furthermore, according to another essential aspect of the invention, the mentioned formula for $y_{12}$ may also be calculated several times and the average value may then be determined.

With respect to details, the $F_{kx}/F_{ky}$ ratio can be determined by the following formula:

$$\frac{F_{kx}}{F_{ky}} = \frac{m_z \times a - F_a}{m_z \times g - F_1 - F_2}$$

wherein $F_1$ is the front axle load of the semitrailer tractor; $F_2$ is its rear axle load; $m_z$ is its mass; $F_a$ is the braking force; $a$ is the braking acceleration; and $g$ is the gravitational acceleration. These quantities are either constants or are known as measurable quantities, as explained above with reference to a normal truck.

In the plurality of cases, the semitrailer tractors have an air suspension only on the rear axle, while only a leaf-spring suspension or spiral-spring suspension is provided on the front axle. Accordingly, no measurable value of the quantity of $F_1$ is available at the front axle. In this case, it is possible to determine the desired ratio $F_{kx}/F_{ky}$ of the horizontal to the vertical component of the overrun force while also taking into account the equilibrium of moments, in which case a knowledge of the force $F_1$ is not required. In this case, the desired ratio $F_{kx}/F_{ky}$ can be determined, for example, according to the following equation:

$$\frac{F_{kx}}{F_{ky}} = \frac{F_2 \times (x_2 - x_1) + F_a \times (y_k - y_{12}) + m_z(x_1 \times g - y_k \times a)}{(m_z \times a - F_a) \times (x_1 - x_k)}$$

wherein $F_a$ is the braking force; $y_k$ and $x_k$ are the relative vertical and horizontal position of the semitrailer coupling with respect to the center of gravity S of the semitrailer tractor; and wherein $x_1$, $x_2$ and $y_{12}$ are the respective relative position of its axles to the center of gravity S. In this case, it should be observed that, in the case of a semitrailer tractor, in contrast to a normal truck, the values of $x_1$, $x_2$ and $y_{12}$ are known because a semitrailer tractor (with the exception of negligible quantities, such as the tank content, etc.) always has approximately the same weight so that these values are vehicle specific and therefore need to be determined only once.

Since, as explained above, the value $F_a$ of the braking force has an uncertainty which cannot be avoided, it is, however, recommended that, the following equations be used for calculating the ratio $F_{kx}/F_{ky}$:

$$F_{ky} = \frac{N_1 \times \frac{y_a - y_{ak}}{x_a - x_{ak}} - \frac{m_a \times a \times x_a}{x_a - x_{ak}} + \frac{m_a \times g \times y_a}{x_a - x_{ak}} + m_z \times a \times K_1 \times \frac{y_a - y_{ak}}{x_a - x_{ak}}}{K_1 + K_2 \frac{y_a - y_{ak}}{x_a - x_{ak}}}$$

$$F_{kx} = \frac{N_1 - F_{ky} \times (x_1 + x_k)}{K_1}$$

If the tractor is a semitrailer tractor having a fifth wheel coupling, the overrun force $F_k$ of the semitrailer therefore acts in the horizontal as well as in the vertical direction and therefore comprises two components $F_{kx}$ and $F_{ky}$. Thus, for the regulating of the braking force of the semitrailer, the ratio $F_{kx}/F_{ky}$ of the horizontal to the vertical component of the overrun force can be compared to the ratio $a/g$ of the vehicle acceleration $a$ to the gravitational acceleration $g$. The reason is that, if the determined ratio $F_{kx}/F_{ky}$ is approximately almost as large as the ratio $a/g$, the braking performance of the semitrailer is adjusted to be exactly correct, while a negative or positive result of the comparison characterizes a running-up or a pulling semitrailer.

the constants $N_1$, $K_1$ and $K_2$ being defined as follows:

$$N_1 = m_z(gx_1 - ay_k) + F_2(x_2 - x_1)$$

$$K_1 = y_y - y_{12}$$

$$K_2 = x_1 - x_k$$

It is demonstrated that in this manner the ratio $F_{kx}/F_{ky}$ can be determined without the use of the uncertain measurable value $F_a$ so that the result is correspondingly precise. Other objects, advantages and novel features of the present invention will become apparent from the following detailed description of the invention when considered in conjunction with the accompanying drawings.

DESCRIPTION OF THE PREFERRED EMBODIMENT

In the following, an embodiment of the invention is first explained in reference to FIG. 1, in the case of which the overrun force for a truck is described. For a better understanding of the truck which is illustrated only schematically in FIG. 1, the geometric relationships and force effects indicated there are listed in Table 1:

TABLE 1

| Abbrev. | Desig. | Dimension | Input Quantity | Measur. Value | Unknown Quantity |
|---|---|---|---|---|---|
| $m_z$ | Mass Truck | kg | | | z,801 |
| $F_1$ | Front axle load truck | N | | $\Rightarrow$ | |
| $X_1$ | x-coordinate front axle | m | | | $\Rightarrow$ |
| $F_2$ | rear axle load truck | N | | $\Rightarrow$ | |
| $X_2$ | x-coordinate rear axle | m | | | $\Rightarrow$ |
| $y_{12}$ | y-coordinate axle | m | | | $\Rightarrow$ |
| $F_a$ | driving/braking force truck | N | | $\Rightarrow$* | |
| $y_k$ | y-coordinate trailer coupling | m | | | $\Rightarrow$ |
| a | vehicle acceleration | m/s² | | $\Rightarrow$ | |
| $y_{ak}$ | distance trailer coupling axle | m | $\Rightarrow$ | | |
| $x_{12}$ | wheel base truck | m | $\Rightarrow$ | | |

In Table 1, it is indicated by means of symbol * that the measurable value $F_a$ has an uncertainty, that is, it does not precisely express the actual braking force. This is the result from the fact that, depending on the wear and the temperature of the brake, the actual braking performance deviates from a preset desired value so that the value $F_a$ has an uncertainty.

Figure 1:
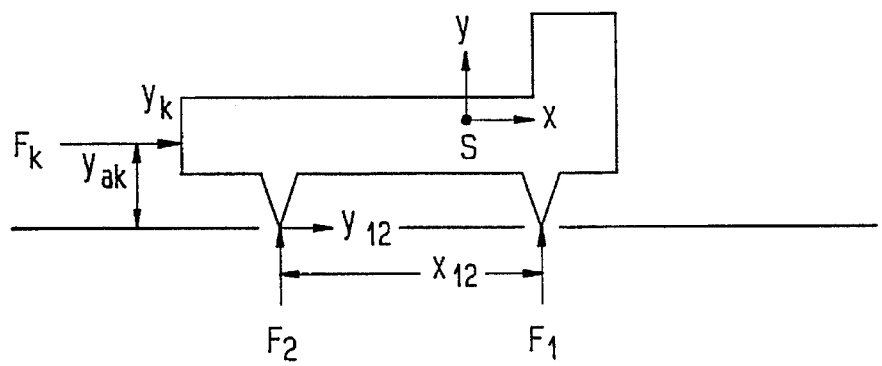
FIG. 1 is a schematic view for explaining the force and moment relationships in the case of a truck when the trailer is coupled.

The following equations may be derived from FIG. 1

Equilibrium of forces of the vertical y-components:

$$F_1 + F_2 - m_z g = 0 \Rightarrow m_z = \frac{F_1 + F_2}{g} \qquad 1.$$

Equilibrium of forces of the horizontal x-components:

$$F_k + F_a - m_z a = 0 \Rightarrow F_a = \frac{F_1 + F_2}{g} a - F_k \qquad 2.$$

Equilibrium of moments:

3. $F_1 x_1 + F_2 x_2 - F_a y_{12} - F_k y_k = 0$

Using equations 1 in equations 2, the required quantity of the overrun force $F_k$ may be indicated as follows:

$$F_k = \frac{(F_1 + F_2)}{g} a - F_a$$

In this equation, all quantities are measurable values or constants so that the value of $F_k$ can be determined, specifically without the requirement of a sensor for the overrun force.

According to a second form of this first embodiment of the invention, the inaccuracy inherent in the measurable value $F_a$ or its influence on the end result is reduced by the additional inclusion of the equilibrium of moments (equation 3).

Taking into account the fact that the vertical distance of the trailer coupling from the axles ($y_{ak}$) according to the following equation 4 is relative to quantities $y_{12}$ and $y_k$:

4. $y_{ak} = y_{12} - y_k$ the required overrun force $F_k$ may also be determined by the following equation:

$$F_k = \frac{F_1 \left( x_1 - \frac{a}{g} y_{12} \right) + F_{12} \left( x_2 - \frac{a}{g} y_{12} \right)}{Y_{ak}}$$

In this formula, the distance $x_1$ and $x_2$ of the front and rear axle from the center of gravity S can be determined from equation 3 if the input of the measurable values takes place at the point in time at which the vehicle is in the rolling unaccelerated condition which can easily be derived from the signal of an electronic diesel injection device (Electronic Diesel Control—EDC). If necessary, these values can also be detected when the truck has just stopped, or immediately after the switching on of the ignition. As indicated initially, however, in the latter case it should be taken into account that this measuring will furnish correct values only when there is a freedom from forces; that is, it is necessary that the truck is completely uncoupled. This would therefore have to be examined by means of corresponding measuring signals.

Based on the above assumption (unaccelerated condition), the values for $x_1$ and $x_2$ are therefore as follows:

$$F_1 \cdot x_1 + F_2 \cdot x_2 = 0 \text{ and} \qquad 5.$$

$$x_{12} = x_1 + x_2 \text{ wheel base } x_{12}) \qquad 5.$$

$$x_2 = x_{12} \times \frac{F_1}{F_1 - F_2} \text{ and } x_1 = x_{12} \times \frac{F_2}{F_2 - F_1}$$

The quantity $y_{12}$, which is still unknown in the above-mentioned equation for $F_k$, can be derived from the following conversions using equation 2 for $F_k$ in equation 3:

$F_1 \cdot x_1 + F_2 \cdot x_2 - F_a \cdot y_{12} - F_k \cdot y_k = 0$ and $2.: F_k = m_z \cdot a - F_a$ Now also use $m_z$ from 1 equation, $y_k$ is determined as the average value from many measurements $F_1$, $F_2$, $F_a$. With $y_{12}=y_{ak}-y_k$, the following is obtained:

$$y_k = \frac{F_1 \times x_1 + F_2 \times x_2 - F_a \times y_{ak}}{m_z \times a} = \qquad 7.$$

$$\frac{(F_1 \times x_1 + F_2 \times x_2 - F_a \times y_{ak})}{(F_1 + F_2)} \times \frac{g}{a}$$

$$y_{12} = y_{ak} - \frac{(F_1 \times x_1 + F_2 \times x_2 - F_a \times y_{ak})}{(F_1 + F_2)} \times \frac{g}{a} \qquad 8.$$

Since the slightly uncertain value $F_a$ has a relatively little effect in this formula and, in addition, the value $y_k$ is calculated several times, and then the average value is determined. From this, the result of $y_{12}$ and therefore particularly that of $F_k$ is relatively precise. For example, it is also possible to repeat the calculation of $y_k$ until the average value will hardly change anymore so that it may be concluded that the value of $F_a$ is largely correct.

When, in contrast, to the first embodiment, the tractor is a semi-trailer tractor (STT) (English: STT—translator) with a fifth wheel coupling, the overrun force is calculated according to the teaching of the following embodiments. In the following, the forces and geometric relationships shown in FIGS. 2 and 3 which are aimed at these embodiments will be described in detail by means of the following Table 2.

In a comparison of Table 1 with the above Table 2, it is demonstrated that, in the case of a semitrailer tractor, in contrast to a normal truck, the values $x_1$, $x_2$ and $y_{12}$ of the axles relative to the center of gravity are known. Because a semitrailer tractor (with the exception of negligible quantities, such as particularly the tank contents) always has approximately the same weight so that these values may be considered as being vehicle-specific and thus need to be determined only once (input quantity).

In the case of a semitrailer tractor, the overrun force $F_k$ of the semitrailer acts in the horizontal as well as in the vertical direction and therefore comprises two components $F_{kx}$ and $F_{ky}$. In order to determine whether the braking performance of the semitrailer is adjusted correctly, the invention is based on the consideration that it is sufficient in this case to compare, for regulating the braking force of the semitrailer, the ratio $F_{kx}/F_{ky}$ of the horizontal to the vertical component of the overrun force with the ratio $a/g$ of the vehicle acceleration a to the gravitational acceleration. The reason is that, when the determined ratio $F_{kx}/F_{ky}$ is almost as large as the ratio $a/g$, the braking performance of the semitrailer is adjusted largely correctly while a negative or positive result of the comparison characterizes an overrunning or a pulling semitrailer respectively.

In this case, the equilibria of forces and moments are as follows:

| Abbrev. | Designation | Dimension | Input Quantity | Meas. Value | Unknown Quantity |
|---|---|---|---|---|---|
| $m_z$ | mass STT | kg | ⇒ | | |
| $F_1$ | front axle load STT | N | | | ⇒ |
| $x_1$ | x-coordinate front axle | m | ⇒ | | |
| $y_{12}$ | y-coordinate axle | m | ⇒ | | |
| $F_2$ | rear axle load STT | N | | ⇒ | |
| $x_2$ | x-coordinate rear axle | m | ⇒ | | |
| $F_a$ | driving/braking force STT | | | ⇒* | |
| $F_{kx}$ | perpendicular coupling force | N | | | ⇒ |
| $F_{kx}$ | horizontal coupling force | N | | | ⇒ |
| $x_k$ | x-coordinate fifth wheel coupling | m | ⇒ | | |
| $y_k$ | y-coordinate fifth wheel coupling | m | ⇒ | | |
| a | vehicle acceleration | m/s² | | ⇒ | |
| $m_a$ | mass of semitrailer | kg | | | ⇒ |
| $x_{ak}$ | x-coordinate fifth wheel coupling | m | | | ⇒ |
| $y_{ak}$ | y-coordinate fifth wheel coupling | m | | | ⇒ |
| $F_{ay}$ | axle load semitrailer | N | | | ⇒ |
| $F_{ax}$ | braking force semitrailer | N | | | ⇒ |
| $x_a$ | x-coordinate semitrailer axle | m | | | ⇒ |
| $y_a$ | y-coordinate semitrailer axle | m | | | ⇒ |

Equilibrium of forces of the y-components:

11. $F_1+F_2+F_{ky}-m_z \cdot g=0 \rightarrow F_1=m_z \cdot g-F_2-F_{ky}$

Equilibrium of forces of the x-components:

12. $F_{kx}+F_a-m_z \cdot a=0 \rightarrow F_a=m_z \cdot a-F_{ky} \cdot a/g$

Equilibrium of moments:

13. $F_1 \cdot x_1+F_2 \cdot x_2+F_{ky} \cdot x_k-F_a \cdot y_{12}-F_{kx} \cdot y_k=0$ When the semitrailer tractor is provided with an air pressure suspension also at the front axle, in contrast to the information in Table, 2, the value $F_1$ is no unknown quantity but a measurable value. Then the value for the ratio to be determined can be derived as follows from the equations 11 and 12:

$$\frac{F_{kx}}{F_{ky}} = \frac{m_z \times a - F_a}{m_z \times g - F_1 - F_2}$$

If, however, a measurable value is not available because of a non-existing front axle air suspension, according to the first form of the second embodiment, as described in FIG. 2, the required ratio can be derived as follows: equation 11 is solved for $F_1$, equation 12 is solved for $F_{kx}$, and these two quantities are used in equation 13. Then the solution for $F_{ky}$ is:

$(m_z \cdot g - F_2 - F_{ky}) \cdot x_1 + F_2 \cdot x_2 + F_{ky} \cdot x_k - F_a \cdot y_{12} -$ $(m_z \cdot a - F_a) \cdot y_k = 0$ $x_1 \cdot m_z \cdot g - x_1 \cdot F_2 - x_1 \cdot F_{xy} + F_2 \cdot x_2 + F_{ky} \cdot x_k - F_a \cdot y_{12} -$ $y_k \cdot m_z \cdot a + y_k \cdot F_a = 0$ $F_2 \cdot (x_2 - x_1) + F_a \cdot (y_k - y_{12}) - F_{ky} \cdot (x_1 - x_k) +$ $m_z \cdot (x_1 \cdot g - y_k \cdot a) = 0$ $$F_{ky} = \frac{F_2 \times (x_2-x_1) + F_a \times (y_k - y_{12}) + m_z(x_1 \times g - y_k \times a)}{(x_1 - x_k)}$$

The required ratio is therefore obtained as follows:

$$\frac{F_{kx}}{F_{ky}} = \frac{F_2 \times (x_2-x_1) + F_a \times (y_k - y_{12}) + m_z(x_1 \times g - y_k \times a)}{(m_x a - F_a) \times (x_1 - x_k)}$$

Figure 2:
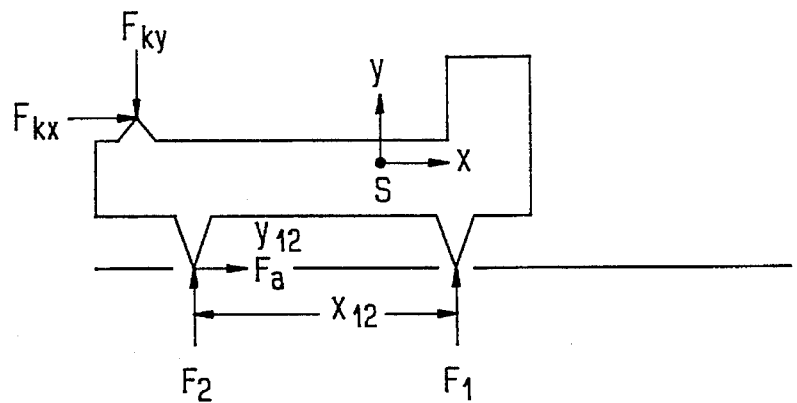
FIG. 2 is a schematic view for explaining the force and moment relationships in the case of a semitrailer tractor when the semitrailer is coupled.
Figure 3:
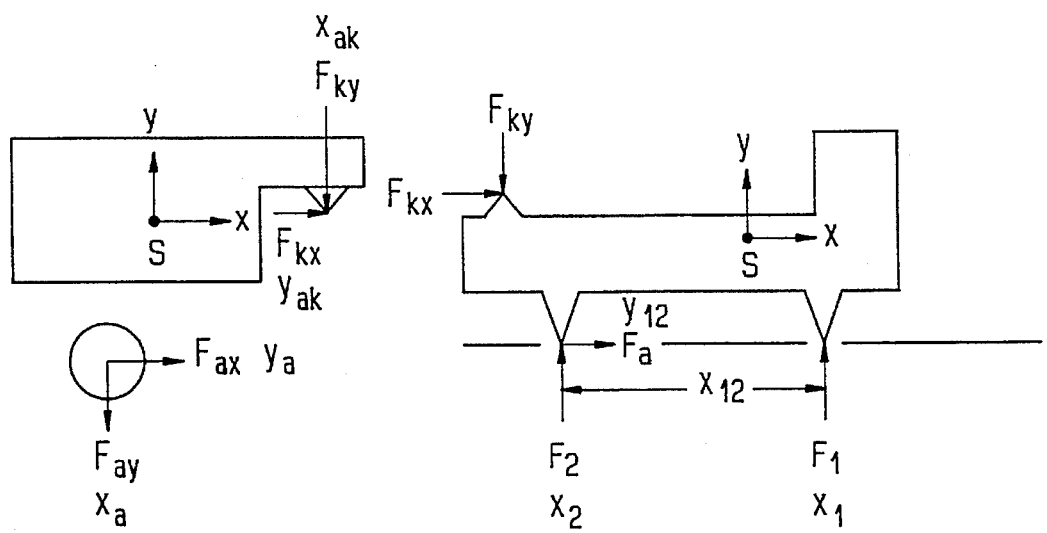
FIG. 3 is an alternative schematic view of the conditions existing in the case of the semitrailer.

This formula, which is derived from the relationships assumed in FIG. 2, has the disadvantage that again, as in the first embodiment, there is the appearance of the uncertain quantity $F_a$. However, this disadvantage can be avoided as follows by the second form of this embodiment according to the relationship indicated in FIG. 3 which also takes into account the geometry of the semitrailer:

From the semitrailer, the following equations are obtained:

$F_{ay} - F_{ky} - m_a \cdot g$      14.
$F_{ay} = F_{ky} + m_a \cdot g$      14a.
$F_{ax} - F_{kx} - m_a \cdot a = 0$      15.
$F_{ax} = F_{kx} + m_a \cdot a$      15a.
$F_{ay} \cdot x_a - F_{ky} \cdot x_{ak} - F_{ax} \cdot y_a + F_{kx} \cdot y_{ak} = 0$      16.

In these equations, the following changes may be made for the semitrailer which is assumed to be unbraked ($F_{ax}=0$) and to be in the rolling condition (a=0 or EDC=0):

17. $F_{ky}=-m_a \cdot a$

18. $(F_{ay} \cdot x_a - F_{ky} \cdot x_{ak}) + F_{kx} \cdot y_{ak}=0$

By means of the appropriate conversion, the following quotients can be determined:

$$\frac{x_a}{x_a - x_{ak}} = \frac{m_z \times g \times x_1 + F_2 \times (x_2 - x_1) + F_a \times (y_k - y_{12})}{-g \times m_a \times (x_1 - x_k)}$$

$$\frac{y_{ak}}{x_a - x_{ak}} = \frac{g}{a} \times \left(\frac{x_a}{x_a - x_{ak}}\right) +$$

$$\frac{m_x(g \times x_1 - a \times y_k) + F_2 \times (x_2 - x_1) + F_a \times (y_k - y_{12})}{m_a \times a \times (x_1 - x_k)}$$

$$\frac{y_a}{x_a - x_{ak}} =$$

$$\frac{m_z \times (g \times x_1 - a \times y_k) + F_2(x_2 - x_1) + F_a(y_k - y_{12})}{(x_1 - x_k) \times (m_a \times a + m_x \times a - F_a)} +$$

$$\frac{m_a \times g \times x_a + m_x \times a \times y_{ak} - F_a \times y_{ak}}{(x_a - x_{ak}) \times (m_a \times a + m_z \times a - F_a)}.$$

However, the following should be observed in these equations:

♦ The first quotient ($x_a/(x_a-x_{ak})$) is to be calculated using measurable quantities which are detected when $F_a>0$.

♦ The second quotient ($y_{ak}/(x_a-x_{ak})$) is to be calculated using measurable quantities which are detected when $F_a>0$ and a=0.

♦ The third quotient ($y_a/(x_a-x_{ak})$) finally is to be calculated using measurable quantities which are detected when $F_a<0$.

On the basis of the above-determined quotients, all quantities are finally known and the value of $F_{ky}$ can be indicated as follows:

$$F_{ky} = \frac{\dfrac{m_z \times (g \times x_1 - a \times y_k) + F_2(x_2-x_1)}{y_k - y_{12}} - \dfrac{m_a(g \times x_a - a \times y_a) + m_z(a \times y_{ak} - a \times y_a)}{y_a - y_{ak}}}{\dfrac{x_1 - x_k}{y_k - y_{12}} + \dfrac{x_a - x_{ak}}{y_a - y_{ak}}}$$

With $N_1 := m_z \cdot (g \cdot x_1 - a \cdot y_k) + F_2(x_2-x_1)$ $K_1 := y_{k-y12}$ $K_2 := x_1 - x_k$ $$F_{ky} = \frac{N_1 \times \frac{y_a - y_{ak}}{x_a - x_{ak}} - \frac{m_a \times a \times x_a}{x_a - x_{ak}} + \frac{m_a \times g \times y_a}{x_a - x_{ak}} + m_z \times a \times K_1 \times \frac{y_a - y_{ak}}{x_a - x_{ak}}}{K_1 + K_2 \times \frac{y_a - y_{ak}}{x_a - x_{ak}}}$$

The above-introduced terms N1 and K1 simplify the equation for $F_{kx}$, which continues to be required, as follows:

$$F_{kx} = \frac{N_1 - F_{ky} \times (x_1 + x_k)}{K_1}$$

The required ratio $F_{kx}/F_{ky}$ can now be calculated without including the uncertain quantity $F_a$. If the front and/or rear axle is composed of two or more individual axles, the mentioned forces $F_1$ and $F_2$ are determined by forming the sum of the detected forces of each individual axle. The respective average value from the coordinates of all individual axles is formed as the horizontal coordinate of the respective double or multiple axle (that is, $x_1$ or $x_2$).

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A process for determining the overrun force experienced by a trailer on a tractor during and using the determined overrun force in a braking operation, wherein the tractor is a truck with a trailer coupling and the overrun force $F_k$ of the trailer acts exclusively in the horizontal direction, comprising:

determining equilibrium of forces which act upon the tractor in a vertical direction, determining equilibrium of forces which act upon the tractor in the horizontal direction;

determining overrun force $F_k$ by the following equation:

$$F_k = \frac{(F_1 + F_2)}{g} a - F_a$$

wherein $F_1$ is the front axle load of the truck, $F_2$ is its rear axle load, $F_a$ is the braking force, a is the braking acceleration, and g is the gravitational acceleration; and modifying the braking of the trailer relative to the braking of the tractor as a function of the determined overrun force $F_k$.

2. A process according to claim 1:

including determining the equilibrium of moments relative to the center of gravity of the truck; and wherein the overrun force $F_k$ is determined by the following equation:

$$F_k = \frac{F_1 \left( x_1 - \frac{a}{g} \times y_{12} \right) + F_{12} \left( x_2 - \frac{a}{g} \times y_{12} \right)}{y_{ak}}$$

wherein $x_1$, $x_2$ and $y_{12}$ are the respective relative horizontal and vertical position of the axles of the truck with respect to its center of gravity and $y_{ak}$ is the vertical distance of the coupling with respect to the wheel axle.

3. A process according to claim 2, including determining the respective relative horizontal position $x_1$, $x_2$ of the axles of the truck with respect to its center of gravity by determining the equilibrium of moments at a point in time at which the truck rolls in an unaccelerated condition.

4. A process according to claim 3, including determining the relative vertical position $y_{12}$ of the axles of the truck with respect to its center of gravity by the following equation:

$$y_{12} = y_{ak} - \frac{(F_1 \times x_1 + F_2 \times x_2 - F_a \times y_{ak})}{(F_1 + F_2)} \times \frac{g}{a}$$

5. A process according to claim 4, wherein the equation for relative vertical position $y_{12}$ is calculated several times and subsequently the average value is determined.

6. A process according to claim 2, including determining the relative vertical position $y_{12}$ of the axles of the truck with respect to its center gravity by the following equation:

$$y_{12} = y_{ak} - \frac{(F_1 \times x_1 + F_2 \times x_2 - F_a \times Y_{ak})}{(F_1 + F_2)} \times \frac{g}{a}$$

7. A process according to claim 6, wherein the equation for relative vertical position $y_{12}$ is calculated several times and subsequently the average value is determined.

8. A process for determining the overrun force experienced by a trailer on a tractor during and using the determined overrun force in a braking operation, wherein the tractor is a semitrailer tractor comprising a fifth wheel coupling, and the overrun force $F_k$ of the semitrailer acts in the horizontal as well as in the vertical direction; comprising:

determining equilibrium of forces which act upon the tractor in a vertical direction, determining equilibrium of forces which act upon the tractor in the horizontal direction;

determining overrun force $F_k$ from the determined vertical and horizontal equilibrium of forces; and modifying the braking of the trailer relative to the braking of the tractor as a function of the determined overrun force $F_k$ by determining the ratio $F_{kx}/F_{ky}$ of the horizontal component $F_{kx}$ to the vertical component $F_{ky}$ of the overrun force and comparing the ratio $F_{kx}/F_{ky}$ with the ratio a/g of the vehicle acceleration a to the gravitational acceleration g.

9. A process according to claim 8, wherein the ratio $F_{kx}/F_{ky}$ of the horizontal component $F_{kx}$ to the vertical component $F_{ky}$ of the overrun force is determined by means of the following equation:

$$\frac{F_{kx}}{F_{ky}} = \frac{m_x \times a - F_a}{m_x \times g - F_1 - F_2}$$

wherein $F_1$ is the front axle load of the semitrailer tractor, $F_2$ is its rear axle load, $m_z$ is its mass, $F_a$ is the braking force, a is the braking acceleration, and g is the gravitational acceleration.

10. A process according to claim 8, wherein, for a semitrailer tractor in which the front axle load $F_1$ cannot be detected, the equilibrium of moments is additionally used in determining the ratio $F_{kx}/F_{ky}$ of the horizontal to the vertical component of the overrun force.

11. A process according to claim 10, wherein the ratio of the horizontal component $F_{kx}$ to the vertical component $F_{ky}$ of the overrun force $F_k$ is determined by the following equation:

$$\frac{F_{kx}}{F_{ky}} = \frac{F_2 \times (x_2 - x_1) + F_a \times (y_k - y_{12}) + m_x(x_1 \times g - y_k \times a)}{(m_x \times a - F_a) \times (x_1 - x_k)}$$

wherein $F_a$ is the braking force, $y_k$ and $x_k$ are the relative vertical and horizontal position of the semitrailer coupling to the center of gravity of the semitrailer tractor, and $x_1$, $x_2$ and $y_{12}$ are the respective relative position of its axles with respect to the center of gravity.

12. A process according to claim 10, wherein the ratio of the horizontal component $F_{kx}$ to the vertical component $F_{ky}$ of the overrun force $F_k$ is determined by the following equations:

$$F_{ky} = \frac{N_1 \times \frac{y_a - y_{ak}}{x_a - x_{ak}} - \frac{m_a \times a \times x_a}{x_a - x_{ak}} + \frac{m_a \times g \times y_a}{x_a - x_{ak}} + m_x \times a \times K_1 \times \frac{y_a - y_{ak}}{x_a - x_{ak}}}{K_1 + K_2 \times \frac{y_a - y_{ak}}{x_a - x_{ak}}}$$

$$F_{kx} = \frac{N_1 - F_{ky} \times (x_1 + x_k)}{K_1}$$

wherein the constants $N_1$, $K_1$ and $K_2$ are defined as follows:

$N_1 := m_z \cdot (g \cdot x_1 - a \cdot y_k) + F_2(x_2 - x_1)$
$K_1 := y_k - y_{12}$
$K_2 := x_1 - x_k$

* * * * *

UNITED STATES PATENT AND TRADEMARK OFFICE
CERTIFICATE OF CORRECTION

PATENT NO. : 5,477,739
DATED : December 26, 1995
INVENTOR(S) : Gustav Hollar and Dr. Eduard Gerum It is certified that error appears in the above-indentified patent and that said Letters Patent is hereby corrected as shown below:

Column 7, line 21, delete "(English; STT-translator)".

In Table 2, change "$F_{KX}$ perpendicular coupling force" to "$F_{KY}$ vertical coupling force".

Signed and Sealed this

First Day of April, 1997

BRUCE LEHMAN

Attest:

*Attesting Officer*    Commissioner of Patents and Trademarks